(12) United States Patent
Jullien et al.

(10) Patent No.: US 10,432,769 B2
(45) Date of Patent: Oct. 1, 2019

(54) ASSEMBLY, SYSTEM AND METHOD FOR REVERSIBLY COMBINING HANDHELD ARTICLES

(71) Applicants: Robert Garland Jullien, Woodbridge, VA (US); Rodney Shepherd, South Riding, VA (US)

(72) Inventors: Robert Garland Jullien, Woodbridge, VA (US); Rodney Shepherd, South Riding, VA (US)

(*) Notice: Subject to any disclaimer, the term of this patent is extended or adjusted under 35 U.S.C. 154(b) by 0 days.

(21) Appl. No.: 15/249,385

(22) Filed: Aug. 27, 2016

(65) Prior Publication Data

US 2019/0124190 A1    Apr. 25, 2019

(51) Int. Cl.
*H04M 1/02* (2006.01)
*H04M 1/21* (2006.01)

(52) U.S. Cl.
CPC ........... *H04M 1/21* (2013.01); *H04M 1/0206* (2013.01)

(58) Field of Classification Search
USPC .................................. 455/556.1, 557, 575.1
See application file for complete search history.

(56) References Cited

U.S. PATENT DOCUMENTS

| 8,418,852 B2* | 4/2013 | Ziemba | A45C 1/04 206/235 |
| 2009/0156272 A1* | 6/2009 | Ohuchi | H04B 1/385 455/575.1 |
| 2015/0157103 A1* | 6/2015 | Simon | G06F 1/1632 224/191 |

* cited by examiner

*Primary Examiner* — Ankur Jain

(57) ABSTRACT

An assembly, system and method for reversibly combining handheld articles, one of which may be a cellular phone. A user may hingedly join cellular phones or other handheld articles with additional handheld articles in such a manner that they may be folded flat against each other in either of two directions. If desired, the cellular phones and other handheld devices may be connected electrically/electronically with each other or with devices or systems external of the assembly.

23 Claims, 14 Drawing Sheets

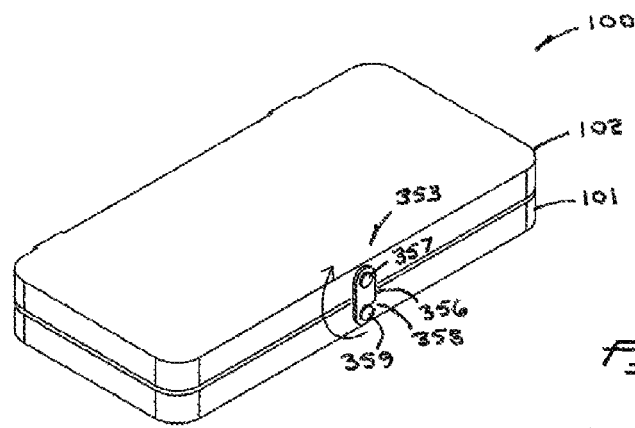
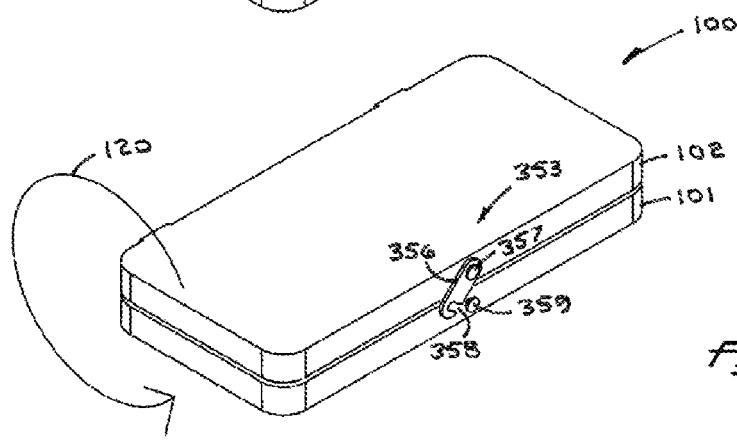
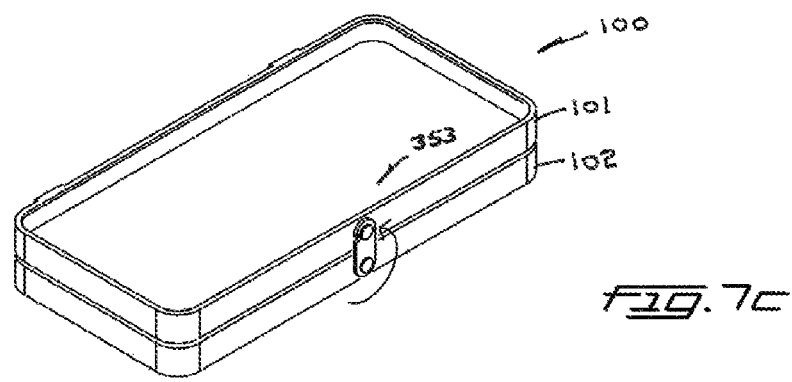

ASSEMBLY, SYSTEM AND METHOD FOR REVERSIBLY COMBINING HANDHELD ARTICLES

CROSS-REFERENCE TO RELATED APPLICATIONS

Not Applicable

BACKGROUND OF THE INVENTION

The present invention relates to the field of handheld articles including electrical, electronic and mechanical devices as well as to consumable items in similarly small packages or housings, such as medications, cosmetics and snack foods. More specifically to providing a convenient means of having more than one of such handheld articles available on a users person and in some cases having more than one of the articles function together to provide either, heretofore unavailable functions, or simply making the availability of functions more convenient.

As a result of the ability of manufactures to provide a wide range of handheld devices, users of these devices have found themselves carrying more than one at a time. Although the desired functions of the multiple devices are available, handling them is neither convenient nor practical. Some of these devices are designed to be interconnected; in some cases with cables, in others through wireless systems, e.g. Bluetooth™. But in many more cases, otherwise possible combined functionality has not been provided for.

Manufacturers have increased functionality of electrical and electronic handheld devices with ever increasing frequency as the ability to provide miniaturization has increased with ever increasing speed. Historic technical limitations within the computer, communication and audio/video fields include the quantity of available memory and the speed with which memory can be accessed. In recent years, from a consumer standpoint, many of these limitations have mostly been eliminated, e.g. available memory. The available storage in cellular phones, for photographs, has moved from on-board memory chips to server storage in "the cloud."

Another issue has been the need to provide for convenient means of interfacing with handheld devices. The users of handheld devices have adapted to what the designers and manufactures have put before them, e.g. miniature qwerty keyboards and "Dick Tracy"© "wrist radio" size screens. Another approach to the interface issue is the recently reported MIT "6th Sense" virtual input/output system. This system and others similar to it may serve some groups of users well. But for the vast majority of handheld device users, having actual input and output devices with hands on capability will serve them better. An ability to pick and choose what combinations of devices to conveniently have with them will provide additional advantages to the users of handheld devices. It is toward these users the present invention is directed.

A device made available by Icephone, Inc. demonstrates a combination of multiple devices with hinged connections, such that the devices will fold flat against each other. This product however, does not allow for the user to choose what devices are combined, nor does it allow for them to join and separate them at will.

As many more handheld devices with ever increasing functionality become available it is even more desirable to add or change-out devices with ones providing additional or upgraded features. The following are references related to the present invention: US patent application 20060007648 and U.S. Pat. Nos. 5,615,765; 6,445,577; 6,728,557; 6,798, 649; 7,483,723; 7,512,426; 7,546,150; 8,413,805; 8,418, 852.

BRIEF SUMMARY OF THE INVENTION

It is therefore an object of the present invention to provide an inexpensive assembly, system and method for users of handheld articles to physically combine them with their cellular phones or other handheld articles and where desirable electrically/electronically connect them in a practical and compact manner.

It is another object of the present invention to allow for users to separate joined handheld articles so that they may; set those aside when they are not needed, replace them with others that provide different functionality, upgrade them with newer articles or components, or simply rearrange them in a group of joined articles or components.

Still another Object of the present invention is to allow for quick exchange of system components that become damaged. This capability becomes particular important for the technical personnel of contractors doing field work, those involved in scientific exploration and for military personnel engaged in field operations.

Still another object of the present invention is to provide manufactures with a system comprising the manufacture of a series of compatible products designed as handheld articles. From these products, their customers will pick and choose ones for combining that are appropriate for their particular use. A first manufacture may also provide system compatible components or design assistance to a second manufacturer of non-competing products so as to allow such products to be combined with the first manufactures handheld articles. Such products may range from communication devices to snack food. Provided herein is a partial list of devices, components and products that will find utility within the scope of this invention:

BRIEF SUMMARY OF THE INVENTION

Cellular phone, cellular phone with multiple SIMs, MP3 player, PDA, I-Pod™, I-Pod Touch™, I-Pod Classic™, I-Phone™, I-Pod Nano™, I-Pod Shuffle™, The New Shuffle™, keyboard, programmable keyboard, touch-screen keyboard, mouse, touch pad, opaque display panel, multiple panel display, "heads-up" display panel, "heads-up" multiple display panel with selective switch, photo voltaic panel, battery pack, rechargeable battery pack, battery pack with induction charging capability, battery pack in combination with at least one photo voltaic cell, multiple solar panel unit, USB male connector, USB female connector, panel with USB male connector and wire, panel with USB male connector and retractable wire, panel with USB female connector and wire, panel with USB female connector and retractable wire, laser pointer, laser alignment device, LED flashlight, GPS device, sonic distance measuring device, laser distance measuring device, SIM docking panel, multiple SIM docking panel with selective switch, flash drive panel, multiple flash drive panel with selective switch, memory card, multiple memory card panel with selective switch, connectivity panel with multiple electrical/electronic jacks, scanner, printer, photo printer, Bluetooth™ compatible receiver, Bluetooth™ compatible transmitter, other Bluetooth™ compatible devices, infrared remote control, PowerPoint™ compatible remote control, programmable remote control, digital still camera, digital video camera, HD video camera, emergency strobe, emergency beacon, emergency radio, transceiver, digital pen, digitizing tablet, digitizing pad, calculator, blood sugar meter, First Touch™, halter monitor, garage door opener/closer, door lock release, remote car starter, vehicle keyless entry, multi-meter, speaker(s), clock, alarm clock, radio, image projector, game console, game handheld control unit, sensing elements for virtual interfaces, "mother-ship" for virtual interface elements, vehicle remote control, web camera, video game, CD player, DVD player, Blueray™ disc player, CD writer, DVD writer, Blueray™ writer, thermometer, barometer, breath-mint receptacle and like-packaged consumer products, credit card reader, credit card chip reader, laser level, syringe pack, medication, cosmetics, makeup mirror, cigarette replacement vapor device and associated products, environmental monitoring devices, medical monitoring devices and devices with close proximity communication capability.

Additional features and advantages of the present invention will become apparent upon the reading of the following description in association with the accompanying drawings.

BRIEF DESCRIPTION OF THE SEVERAL VIEWS OF THE DRAWINGS

FIGS. 7a, 7b, and 7c are isometric views of the present invention illustrating the use of a latch.

DETAILED DESCRIPTION OF THE INVENTION

Figure 1A:
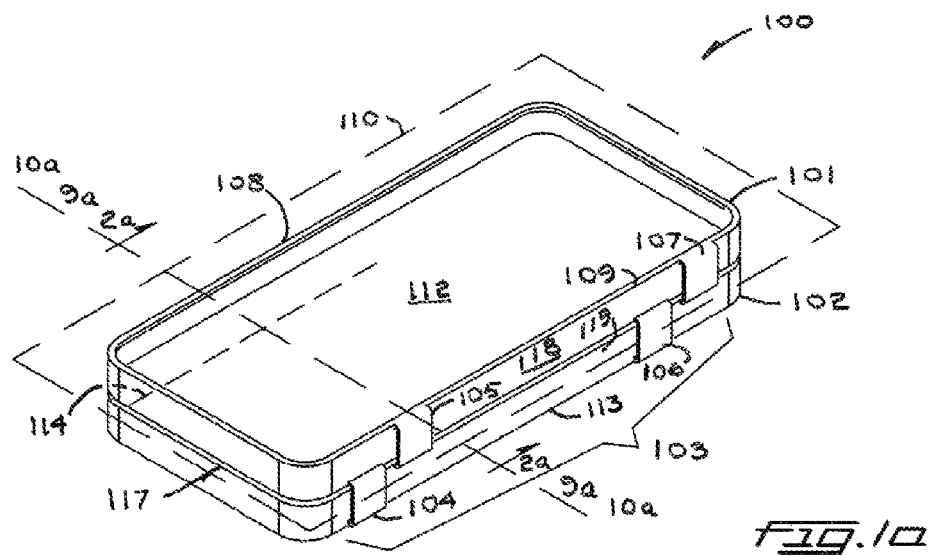
FIGS. 1a and 1b are isometrics views illustrating a preferred assembly according to the present invention.

FIG. 1a is an isometric view illustrating a preferred assembly according to the present invention generally designated by numeral 100. A first receptacle 101 with parallel edges 108 and 109 defining first plane 110 is shown. A hidden side of first receptacle wall 112 defines second plane 111 (not shown) (see FIG. 2a) First plane 110 and second plane 111 are parallel. A second receptacle 102 has parallel edges 113 and 114 defining third plane 115 (not shown) (see FIG. 2a). Second receptacle wall 117 defines fourth plane 116 (not shown). Third and fourth planes are parallel. Hinge 103, made up of flexible elements 104, 105, 106 and 107 is also shown. Flexible elements 105 and 107 are adjacent to side wall 118 of first receptacle 101 and flexible elements 104 and 107 are adjacent to side wall 119 of second receptacle 102. In FIGS. 1a, 1b, 2a, 2b, receptacles and hinge elements are shown as unitary structures. With respect to hinge elements and their attachment to receptacle side walls a wide variety of structures may be used within the scope of the present invention. Section cut line 10a, 9a, 2a/2a, 9a, 10a is also shown.

Figure 1B:
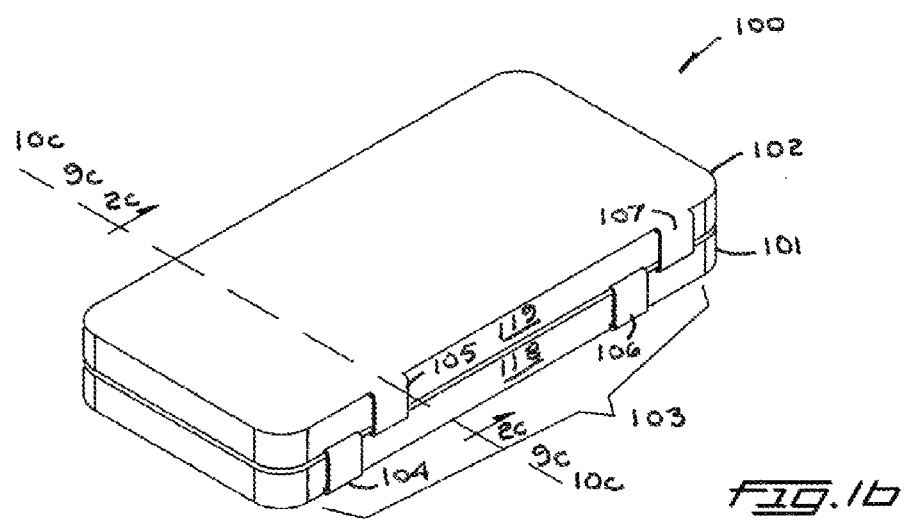

FIG. 1b is an isometric view illustrating the preferred assembly of FIG. 1a according to the present invention generally designated by numeral 100. Arrow 120 on FIG. 2a indicates the relative rotation of 360 degrees that has occurred between first receptacle 101 and second receptacle 102 going from a first position of FIG. 1a to a second position of FIG. 1b. Section cut line 10c, 9c, 2c/2c, 9c, 10c is also shown.

Figure 2A:
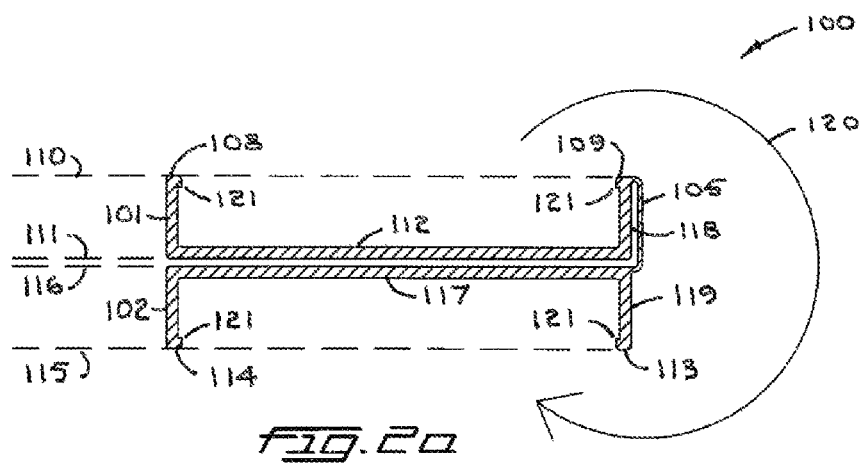
FIGS. 2a and 2b are sectional views of FIGS. 1a and 1b respectively illustrating a preferred assembly according to the present invention.
Figure 2B:
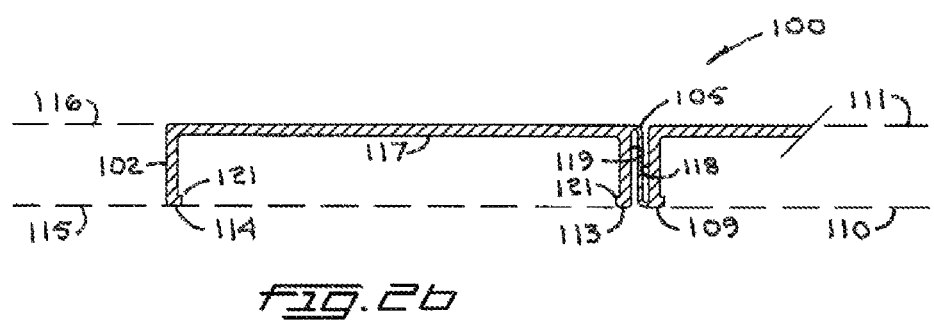
Figure 2C:
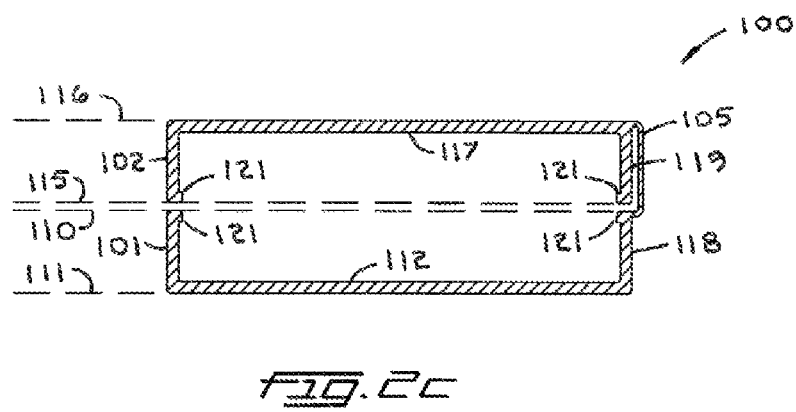

FIGS. 2a, 2b & 2c are sectional views illustrating the preferred assembly of FIGS. 1a and 1b respectively according to the present invention and each view is generally designated by numeral 100. First receptacle 101 with parallel edges 108 and 109 defining first plane 110 shown as a dashed line. Receptacle wall 112 defines second plane 111 shown as a dashed line. First plane 110 and second plane 111 are parallel. Second receptacle 102 with parallel edges 113 and 114 defining third plane 115 shown as a dashed line. Second receptacle wall 117 defines fourth plane 116 shown as a dashed line. Third and fourth planes axe parallel. In FIG. 2a hinge element 105 of hinge 103 (not shown) (see FIG. 1) is adjacent to side wall 118. This embodiment of the present invention is shown in an open wall/open wall configuration. In this configuration working sides of two handheld articles (not shown) engaged by edge returns 121 of receptacles 101 and 102 would be exposed (the first position where second and fourth planes are adjacent). In FIG. 2e, considering receptacle 102 to have been held in a fixed position, receptacle 101 has been rotated along path indicated by arrow 120 shown in FIG. 2a. Hinge element 105 of hinge 103 (not shown) (see FIG. 1) is now adjacent to side wall 119 of second receptacle 102. Hinge elements 104, 106 and 107 (see FIG. 1a) make a similar transition (not shown). In this configuration, working sides of two handheld articles (not shown) engaged by return edges 121 of receptacles 101 and 102 would be in a face to face configuration and unexposed (the second position where first and third planes are adjacent). FIG. 2b shows an intermediate position between first and second positions.

Figure 3A:
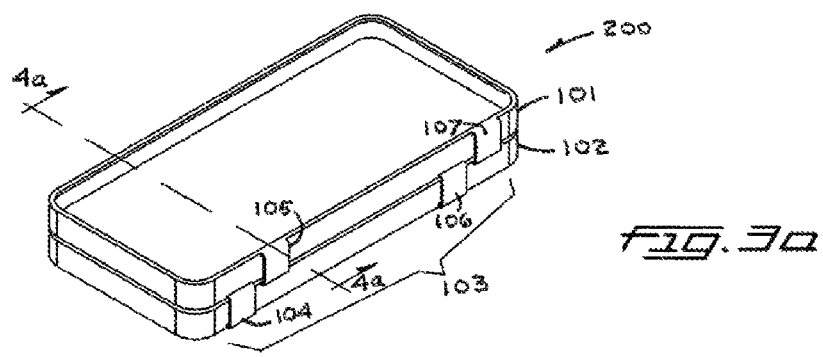
FIGS. 3a, 3b and 3c are isometric views of a preferred assembly according to the present invention.
Figure 3B:
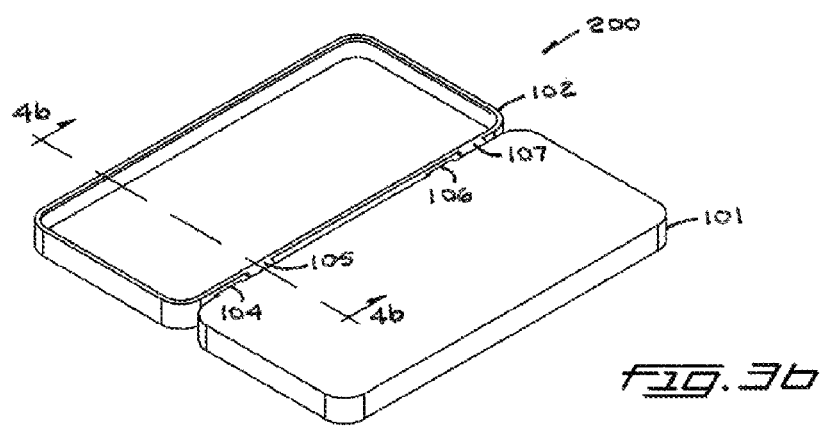
Figure 3C:
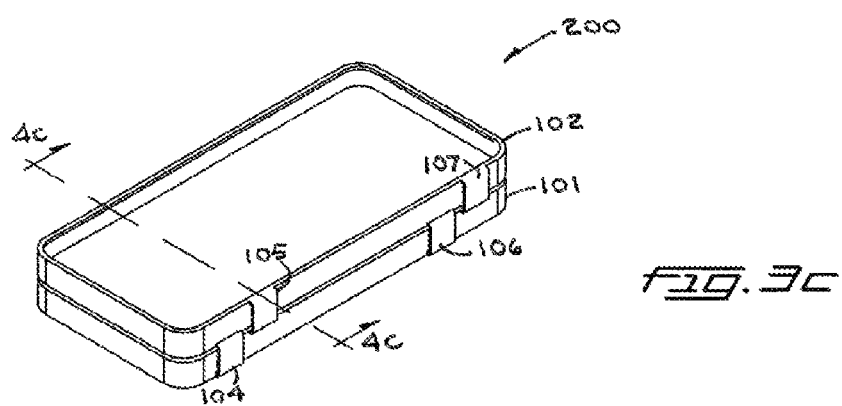

FIGS. 3a, 3b and 3c are isometric views illustrating a preferred assembly according to the present invention, each generally designated by numeral 200. Receptacles 101 and 102 are joined by hinge 103 made up of elements 104, 105, 106 and 107. FIGS. 3a and 3c show two configurations with relative rotation of 360 degrees having taken place between the two configurations (see arrow 120 in FIG. 4a). FIG. 3b illustrates an intermediate position of the 360 degree rotation. Handheld articles 140 and 150 are not shown for clarity (see FIGS. 4a, 4b & 4c).

Figure 4A:
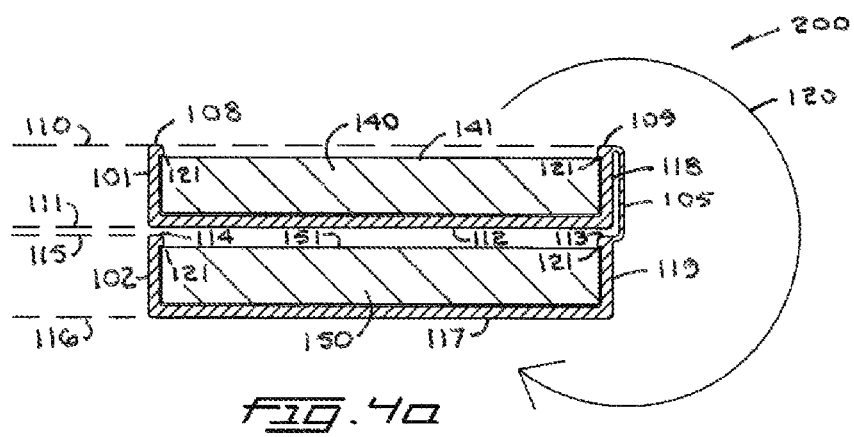
FIGS. 4a, 4b and 4c are sectional views of FIGS. 3a, 3b and 3c respectively illustrating a preferred assembly according to the present invention.
Figure 4B:
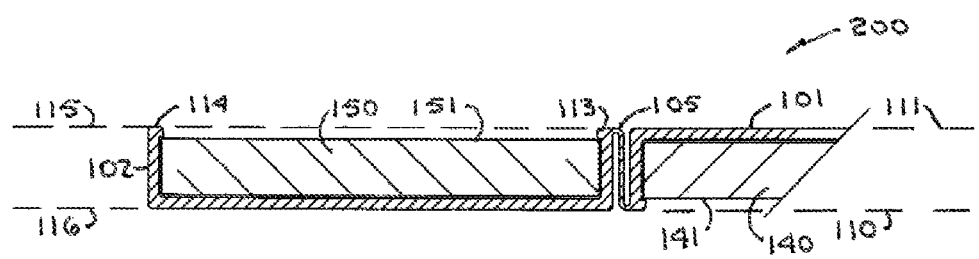
Figure 4C:
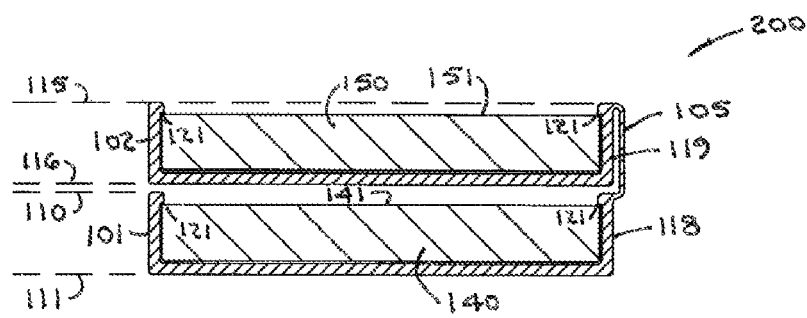

FIGS. 4a, 4b and 4c are sectional views of FIGS. 3a, 3b and 3c respectively, each generally designated by numeral 200. First receptacle 101 with parallel edges 108 and 109 define first plane 110 shown as a dashed line. Receptacle wall 112 defines second plane 111 shown as a dashed line. First plane 110 and second plane 111 are parallel. Second receptacle 102 with parallel edges 113 and 114 define third plane 115 shown as a dashed line. Second receptacle wall 117 defines fourth plane 116 shown as a dashed line. Third and fourth planes are parallel. In FIG. 4a hinge element 105 of hinge 103 (not shown) (see FIG. 3a) is adjacent to side wall 118. This embodiment of the present invention is shown in an open wall/closed wall configuration. In this configuration the working side 141 of handheld article 140 engaged by edge returns 121 of receptacle 101 is exposed and the working side 151 of handheld article 150 engaged by edge returns 121 of receptacle 102 is unexposed (the first position where second and third planes are adjacent). In FIG. 4c, considering receptacle 102 to have been held in a fixed position, receptacle 101 has been rotated along path indicated by arrow 120 shown in FIG. 4a. Hinge element 105 of hinge 103 (not shown) (see FIG. 1) is now adjacent to side wall 119 of second receptacle 102. Hinge elements 104, 106 and 107 make a similar transition (not shown). In this configuration the working side 151 of handheld article 150 is exposed and the working side 141 of handheld article 140 is unexposed. (the second position where first and fourth planes are adjacent). FIG. 4b is a partial section illustrating an intermediate position of receptacles 101 and 102. In this configuration both working sides 141 and 151 of handheld articles 140 and 150 respectively are exposed.

Figure 5:
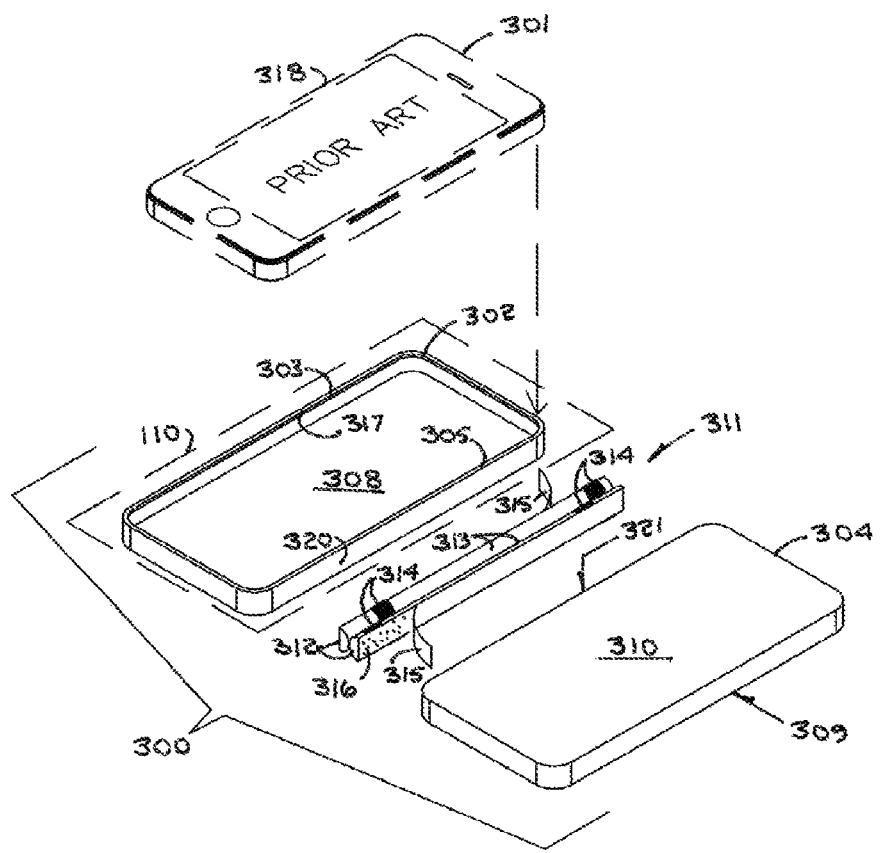
FIG. 5 is an isometric view of the present invention illustrating the separate components necessary to the assembly having one receptacle, one additional handheld article and showing a PRIOR ART handheld article.

FIG. 5 is an isometric view illustrating the components that make up a preferred assembly of the present invention generally designated by numeral 300. This view depicts an embodiment for combining a PRIOR ART cellular phone 301 with additional handheld article 304. Receptacle 302 has parallel edges 303 and 305 defining first plane 110 depicted by dashed lines. Second plane 111 (nut shown) is defined by the exterior face (not shown) of receptacle wall 308. Additional handheld article 304 has exterior walls 309 and 310 defining third plain 115 (not shown) and fourth plane 116 (not shown) respectively. Hinge assembly generally designated as numeral 311 includes two elements 312, each with an arcuate surface 313 and flexible joining elements 314. Joining elements 314 allow relative rotation of elements 312 of 360 degrees. Peel-off strips 315 expose two adhesive surfaces 316 (one hidden) for attachment of hinge assembly 311 to receptacle 302 and additional handheld article 304 on sidewalls 320 and 321 respectively. Perimeter edge return 317 engages perimeter edge 318 of PRIOR ART cellular phone 301 when PRIOR ART cellular phone 301 is received by receptacle 302. Adhesive hinge attachment to receptacles and additional handheld articles is illustrative of many attachment options including key hole and flanged pin, hook and loop, machine screw, and including at least a portion of the hinge assembly with at least one receptacle or one additional handheld article in a unitary structure.

Figure 6:
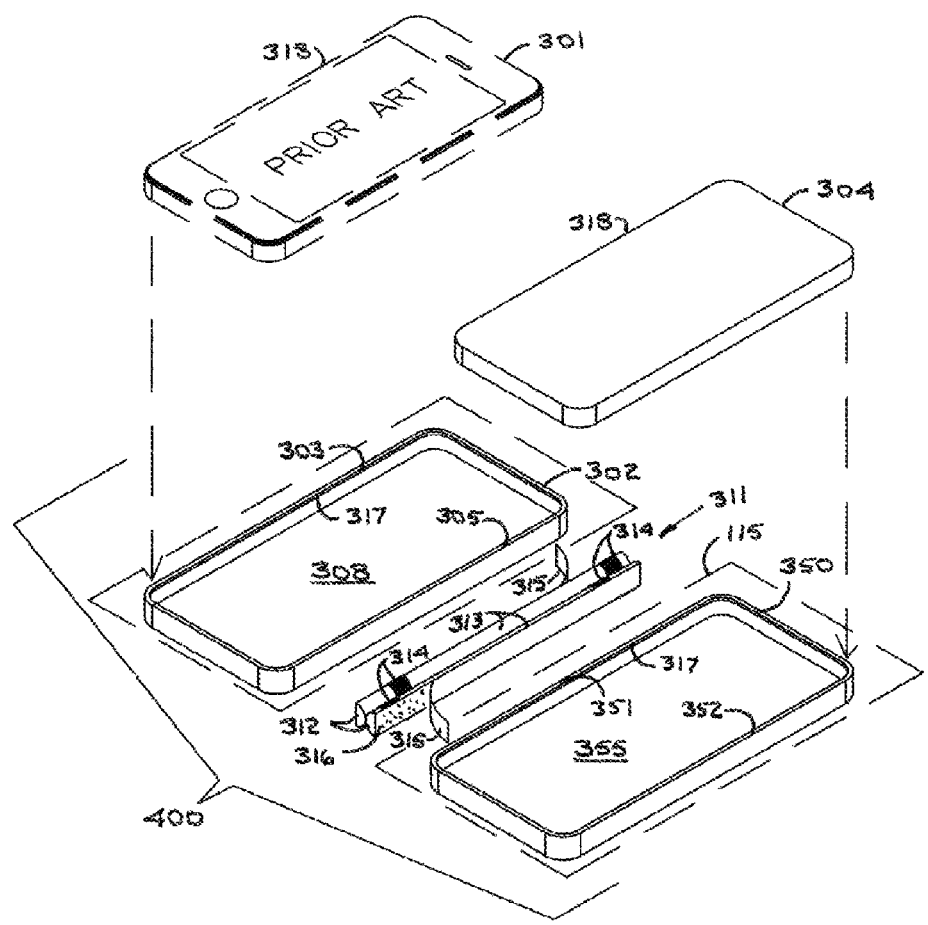
FIG. 6. Is isometric views of a preferred assembly according to the present invention.

FIG. 6 is an isometric view illustrating the components that make up a preferred assembly of the present invention generally designated by numeral 400. This view depicts an embodiment for combining a PRIOR ART cellular phone or another handheld article 301 with additional handheld article 304. First receptacle 302 has parallel edges 303 and 305 defining first plane 110 depicted by dashed lines. Second plane 111 (not shown) is defined by the exterior face of receptacle wall 308. Second receptacle 350 has parallel edges 351 and 352 defining third plane 115 depicted by dashed lines. fourth plane 116 (not shown) is defined by the exterior face of receptacle wall 355. Hinge assembly generally designated as numeral 311 includes two elements 312, each with an arcuate surface 313 and flexible joining elements 314. Joining elements 314 allow relative rotation of elements 312 of 360 degrees (see FIGS. 9a, 9b and 9c). Peel-off strips 315 expose two adhesive surfaces 316 (one hidden) for attachment of hinge assembly 311 to first receptacle 302 and second receptacle 350. Perimeter edge returns 317 engage perimeter edges 318 of additional handheld article 304 and PRIOR ART cellular phone 301 when they are received by receptacles 350 and 302 respectively.

FIGS. 7a, 7b and 7c depict a preferred embodiment of the present invention generally designated by numeral 100 illustrating the use of a latch for securing receptacles 101 and 102 in each of the first and second positions. Latch generally designated as numeral 353 consists of rotating bar 356, pivot pin 357, latching slot 358 and latching pin 359. FIG. 7a depicts latch 353 securing receptacles 101 and 102 in the second position (see FIGS. 2a and 2b.) FIG. 7b shows latch 353 in an unlatched position. Arrow 120 indicates direction of rotation of receptacle 102 relative to receptacle 101 to place the assembly in the first position (see FIGS. 2a and 2b.) of FIG. 7c. In FIG. 7c latch 353 is again in the latched position securing receptacles 101 and 102 in the first position. It is understood that latch 353 is just an example of many latch types within the scope of the present invention that may be used. These include sliding elements with detents (not shown), hook and loop attachment (not shown), male and female snapping elements and magnetic latching (not shown). Magnetic latching may include multiple magnets (not shown) or a combination of magnet and a magnetic metal (not shown).

Figure 8:
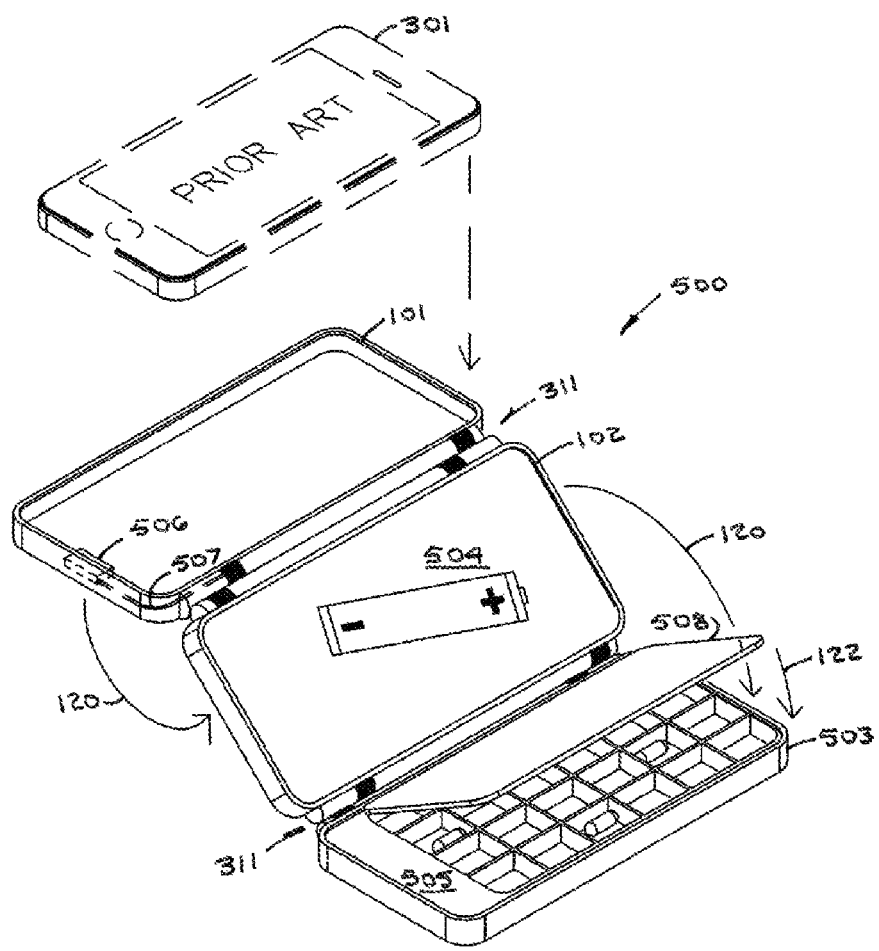
FIG. 8 is an isometric view of the present invention.

FIG. 8 is an isometric view illustrating a preferred assembly according to the present invention generally designated by numeral 500. This assembly includes two hinges, 311 (see FIGS. 5 and 6). joining first receptacle 101, second receptacle 102 and a third receptacle 503. Receptacles 102 and 503 have received and engaged additional handheld articles 504 and 505 respectively. Arrow 122 indicates direction for closing of cover-plate 508 of pill box 505. Additional handheld articles, battery pack 504 and pill box 505 are used to illustrate a wide variety of additional handheld articles that will find utility within the scope of the present invention. Receptacle 101 includes male plug 506 wired to hinge 311 with cable 507. In this embodiment of the present invention first receptacle 101 with male plug 506 is designed for a specific PRIOR ART cellular phone or another specific handheld article 301. Arrows 120 indicate directions of rotation of receptacles 101, 102 and 503 about hinges 311 to put assembly 500 in one of two of its most compact configurations. Reversing the directions of rotation will put assembly 500 in the other most compact configuration.

Figure 9A:
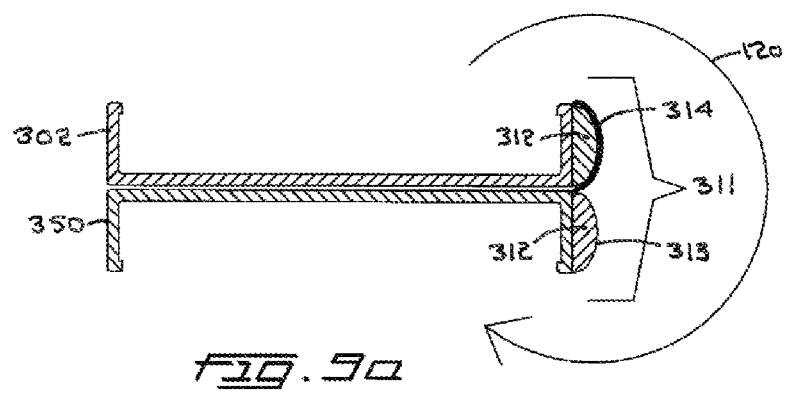
FIGS. 9a, 9b and 9c are sectional views of an alternate hinge.
Figure 9B:
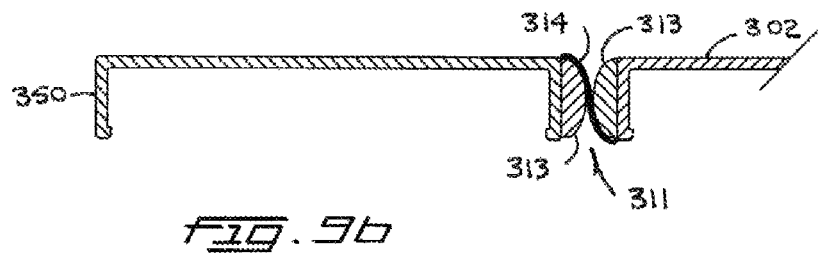
Figure 9C:
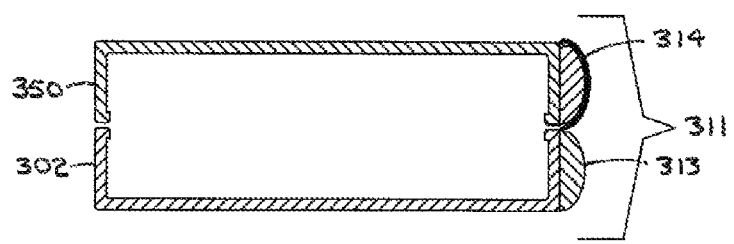
Figure 10A:
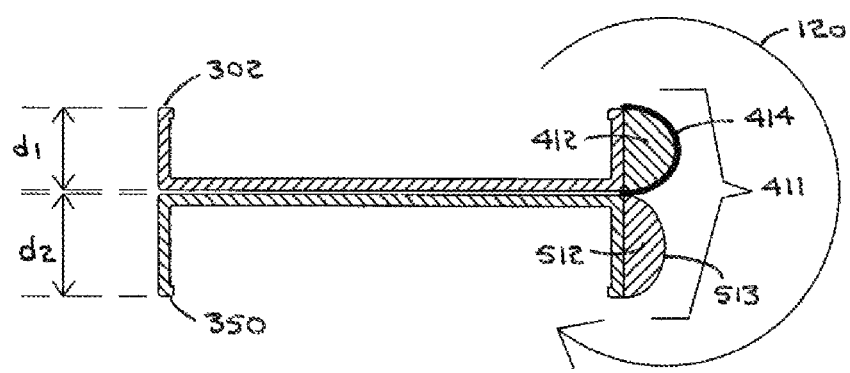
FIGS. 10a, 10b and 10c are sectional views of a second alternate hinge for joining receptacles and additional handheld articles of different thickness.
Figure 10B:
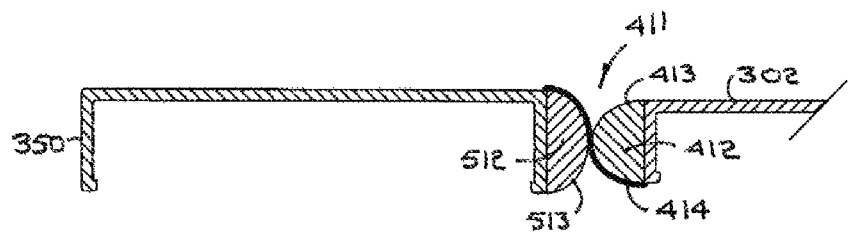

FIGS. 9a, 9b, 9c and 10a, 10b, 10c are sections depicting alternate hinges for those shown in FIGS. 1a, 1b and 2a, 2b & 2c. The hinge type shown in 9a, 9b and 9c is also described in FIGS. 5 and 6. First and second receptacles 302 and 350 respectively are joined by hinge assembly generally designated as numeral 311. Hinge assembly 311 includes two elements 312, each with an arcuate surface 313 and flexible joining elements 314. Joining elements 314 allow relative rotation of elements 312 of 360 degrees and subsequently 360 degrees of rotation between first receptacle 303 and second receptacle 350. In FIG. 9c, considering receptacle 350 to have been held in a fixed position, receptacle 302 has been rotated along path indicated by arrow 120 shown in FIG. 9a. FIGS. 9b & 10b are partial sections depicting an intermediate position between those shown in FIGS. 9a & 9c/10a & 10c.

Figure 10C:
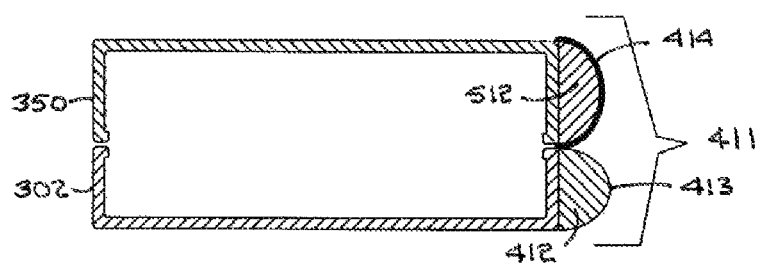

FIGS. 10a, 10b and 10c include elements that function in the same manner as those of FIGS. 9a, 9b and 9c but also allow the joining of receptacles with different thicknesses and the joining of additional handheld articles of different thicknesses and handheld articles with receptacles of different thicknesses. First and second receptacles 302 and 350 respectively are joined by hinge assembly generally designated as numeral 411. Hinge assembly 411 includes elements 412 and 512, each with an arcuate surface 413 and 513 respectively. Flexible joining elements 314 (one shown, see FIGS. 5 & 6) allow relative rotation of elements 412 and 512 360 degrees and subsequently 360 degrees of rotation between first receptacle 302 and second receptacle 350. In FIG. 10c, considering receptacle 350 to have been held in a fixed position, receptacle 302 has been rotated along path indicated by arrow 120 shown in FIG. 10a. Although the thicknesses of receptacles 302 and 350 are different as indicated by dimension arrows d sub1 & d sub2, the curved length of arcuate surfaces 413 and 513 are the same. In this illustration, arcuate surfaces 413 and 513 were derived by dividing an ellipse into two equal parts two times with two lines of division, the two lines being 90 degrees apart. Each of two different half ellipses were used to derive the sections of arcuate surfaces 413 and 513. Other methods of deriving arcuate surfaces of equal length for joining of receptacles of different thicknesses are equally valid within the scope of the present invention.

Figure 11A:
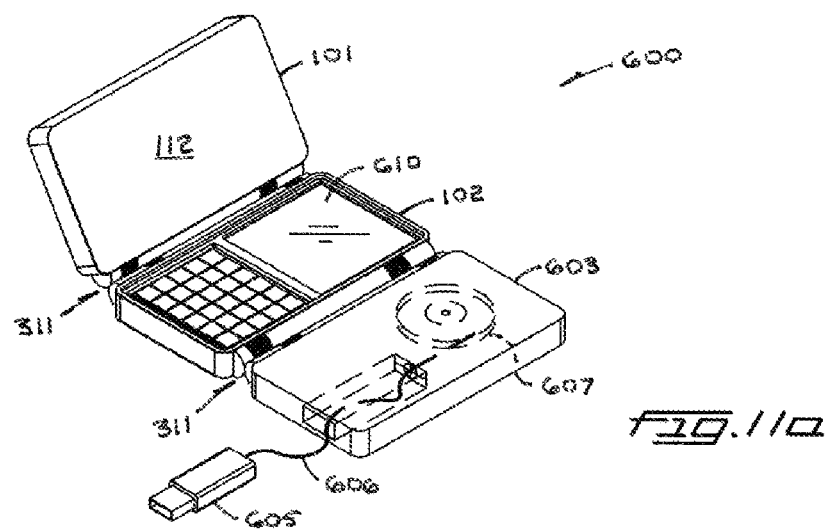
FIGS. 11a and 11b are isometric views of assemblies according to the present invention.
Figure 11B:
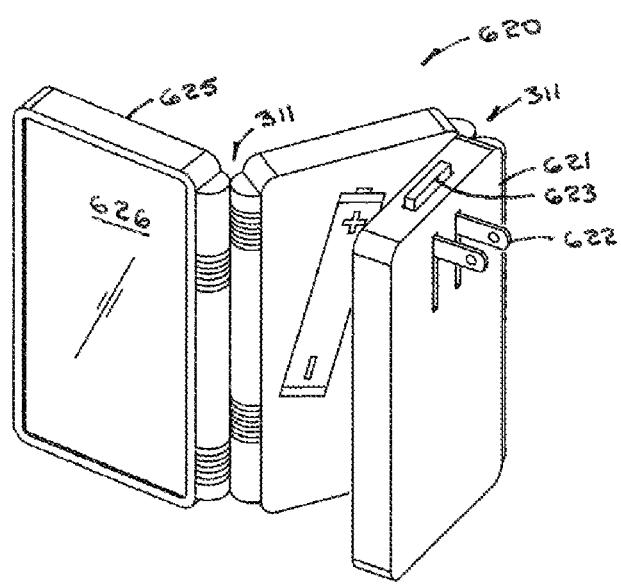

FIGS. 11a and 11b are two isometric views illustrating two preferred assemblies according to the present invention generally designated by numerals 600 and 620 respectively. Assembly 600 includes first and second receptacles 101 and 102 respectively. Receptacle 101 has exterior of wall 112 exposed. Opposite side of receptacle 101 (not shown) is open to receive and engage a PRIOR ART cellular phone (not shown) another handheld article (not shown) or an additional handheld article (not shown) in accordance with the present invention. Second receptacle 602 is shown having received and engaged additional handheld article 610. Additional handheld article 603 includes USB plug 605 with wire 606 and wire take-up reel 607. USB plug allows for power to be obtained and data to be exchanged from a system or systems exterior to said assembly (not shown). Hinges 311 are wired (wiring not shown) for transmission of power, data or both between first receptacle 101 and second receptacle 102 for connection of handheld article 610 to PRIOR ART cellular phone (not shown) or another handheld article (not shown) and/or to additional handheld article 603 for transmission of power, data or both between additional handheld articles 610 and 603.

FIG. 11b Illustrates an assembly according to the present invention including additional handheld article plug-in power transformer 621 with retractable plug 622 and plug release 623. Also included is additional handheld article 624, a battery pack and first receptacle 625 with another handheld article 626 having been received and engaged by first receptacle 625. Similarly to FIG. 11a, hinges 311 are wired (wiring not shown) for power transmission.

Figure 12:
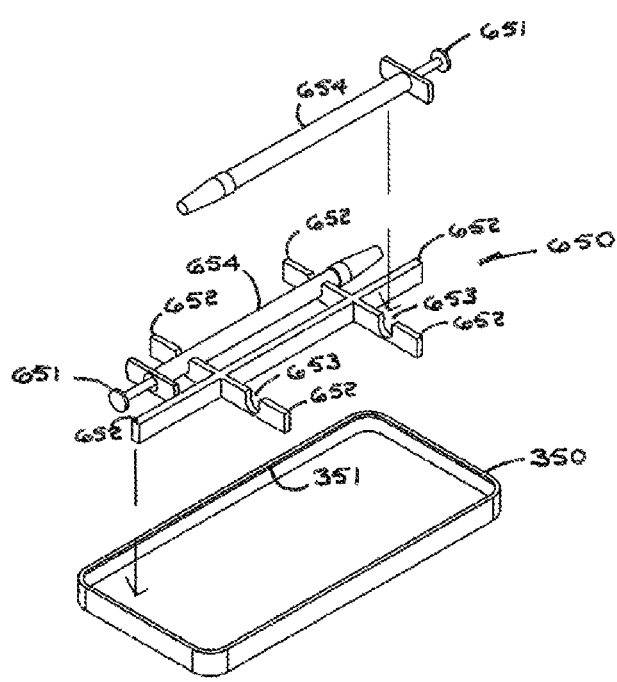
FIG. 12 is an isometric view of the present invention including an adapter for engaging handheld articles.

FIG. 12 is an isometric view illustrating an adapter according to the present invention generally designated as numeral 650 used to facilitate engagement of additional handheld articles, syringes 651 with second receptacle 350. Edge return 351 engages upper edges 652 of adapter 650 and slots 653 of adapter 650 engage syringe bodies 654.

Figure 13:
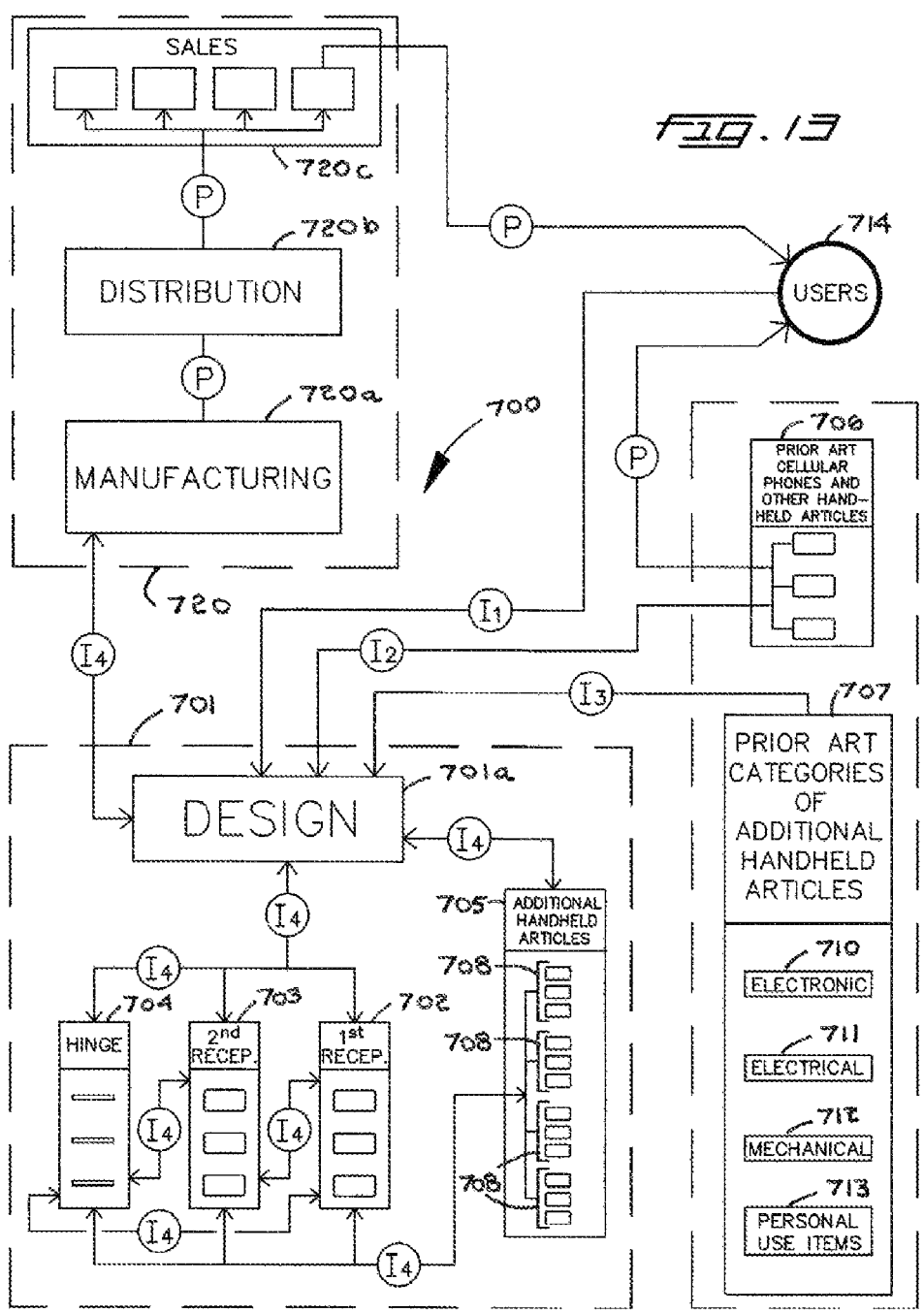
FIG. 13 is a block diagram in accordance with the present invention depicting a system making it possible for a user of multiple handheld articles to combine a PRIOR ART cellular phone or other PRIOR ART handheld article with at least one member of at least one set of additional handheld articles.

FIG. 13 is a block diagram of an embodiment of the present invention generally designated by numeral 700 depicting a system making it possible for the users of multiple handheld articles to reversibly combine PRIOR ART cellular phones or other PRIOR ART handheld articles 706 with at least one member of at least one set of additional handheld articles 705. Lines terminating in arrows, indicating the flow and direction of information, are depicted by an "I" inside a circle, or the flow and direction of products are indicated by a "P" in a circle. I sub1, I sub2, I sub3 and I sub4 depict information that originated with the users 714 of multiple handheld articles, characteristics of particular cellular phones or other handheld articles 706, characteristics of PRIOR ART categories 707 and information generated by the design process 701a respectively. Blocks within dashed box 701 include the major components necessary to the assembly 715 (not shown, see FIG. 14). Assembly 715 is one embodiment of many embodiments of the present invention made possible by the system depicted in this figure, FIG. 13. Box 701 and its description also depicts and explains the relationships between the major components and how their design is coordinated by the design process 701a. These components are first receptacle means 702, designed to engage a PRIOR ART cellular phone or other PRIOR ART handheld article 706, second receptacle means 703, designed to engage additional handheld articles 705 and hinge 704, designed to join first receptacle 702 with second receptacle 703, providing 360 degrees of rotation. Additional handheld articles 705 are grouped in sets 708. Members of each set are designed to be compatible with at least one of the receptacles 703 and each set may contain articles from multiple PRIOR ART categories depicted in block 707 or may contain articles from only one of the categories. Categories shown include electronic devices 710, electrical devices 711, mechanical devices 712 and items for personal use 713 that further include medication, cosmetics and food products (not shown). Dashed box 720 includes macro operations of manufacturing 720a, distribution 720b and sales 720c required to provide the users, 714 with the assembly 715 shown in FIG. 14.

Figure 14:
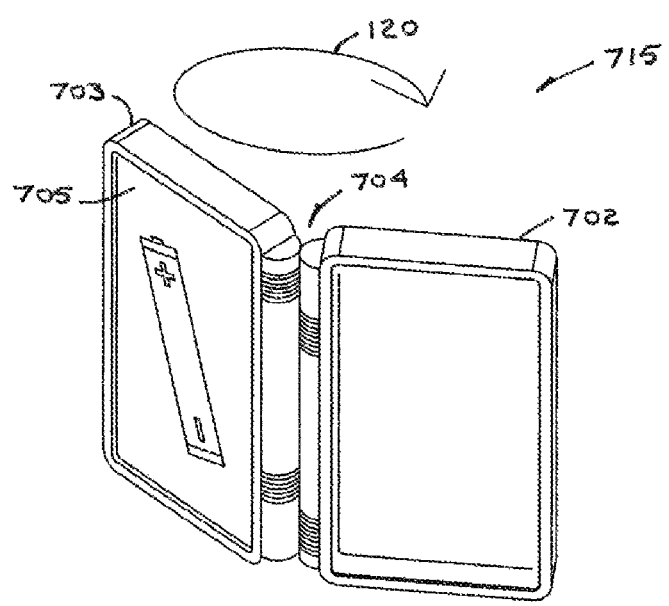
FIG. 14 is an isometric view of an assembly in accordance with the present invention.

FIG. 14 depicts assembly 715, an example of all assemblies made possible by the system of FIG. 12 in accordance with the present invention, including the elements depicted in FIG. 13, first receptacle 702, second receptacle 703, hinge 704 and an additional handheld article 705, shown as a battery pack, chosen from the PRIOR ART categories of additional handheld articles 707 (not shown, see FIG. 13). Assembly 715 is shown ready to receive a PRIOR ART cellular phone or other PRIOR ART handheld article 706 (not shown) of FIG. 13. Arc 120 indicates 360 degrees of rotation of first receptacle 702 relative to second receptacle 703 made possible by hinge 704.

Although design, manufacturing and sales may be handled by the same organization, it is likely that some manufacturers of equipment, consumer items and other articles, would involve other organizations. They might get assistance from one or more cellular phone manufacturers whose phones they chose to interface with or whose phones they believe their customers are more likely to use. The manufacturer of additional handheld articles could make an arrangement with a manufacturer of cellular phone cases to produce an assembly in accordance with the present invention that would be compatible with both their cellular phone of choice and the equipment or product they plan to market. Manufacturers of different equipment or products that may have mutually beneficial functionality may join forces to combine their products in an assembly compatible with both, in accordance with the present invention, and by the same token may include the PRIOR ART cellular phone of their choice.

While the description and drawings of the present invention contained herein describe exemplary embodiments of the invention, it is to be understood that the invention is not limited to the disclosed embodiments, but on the contrary, includes various modifications and equivalent arrangements inferred by and included in the sprite and scope of the appended claims.

What is claimed:

1. An assembly, of components, adapted for combining two handheld articles, a first handheld article and a second handheld article, each chosen from at least one of the following categories; electronic devices, electrical devices, mechanical devices and items for personal use including medication, cosmetics and food products, said assembly comprising:
    a first receptacle means for receiving and reversibly engaging at least a portion of said first handheld article, said first receptacle means defining first and second planes and includes four sidewalls, a first two having lengths longer than a second two;
    a second receptacle means for receiving and reversibly engaging at least a portion of said second handheld article, said second receptacle means defining third and teeth fourth planes and includes four sidewalls, a first two having lengths longer than a second two;
    a hinge means for hingedly joining said first and second receptacle means' along one of said first sidewalls of each of said first and second receptacle means', said hinge means adapted for rotation of said first and second receptacle means' between a first position and a second position, wherein
    rotation between said first position and said second position includes 360 degrees;
    said assembly components adapted for multiple configurations, wherein a first configuration comprises:
    one face each of said first receptacle means and said second receptacle means oppositely exposed in the first position and the faces are now adjacently concealed in the second position upon rotation; and
    wherein a second configuration comprises:
    only one of said faces is exposed in the first position and the other of said faces is exposed in the second position resulting in said exposed face of said first position now being concealed upon rotation.

2. An assembly as in claim 1, wherein said assembly further comprises latching means for selectively latching said assembly in at least one of said first and second positions.

3. An assembly as in claim 1, wherein said at least one of said first receptacle means, said second receptacle means and said hinge means is adapted to facilitate transfer of power and/or data between said two handheld articles.

4. An assembly as in claim 1, wherein at least one of said first receptacle means, said second receptacle means and said hinge means is adapted to facilitate transfer of power and/or data between at least one of said two handheld articles and devices or systems external of said assembly.

5. An assembly as in claim 1, wherein said assembly further comprises receiving and reversible engagement means for receiving and reversible engagement of said at least a portion of said second handheld article with said second receptacle means in lieu of said second receptacle means being adapted to receive and reversibly engage said at least a portion of said second handheld article.

6. An assembly as in claim 1, wherein at least two of said first receptacle means, said second receptacle means and said hinge means comprise a unitary structure.

7. An assembly as in claim 1, wherein said side walls of said first receptacle means differ in width from those of said second receptacle means and said hinge means includes at least one arcuate surface on each of said first and second receptacle means'and further, said arcuate surface(s) of said first receptacle means differ in shape from said arcuate surface(s) of said second receptacle means to accommodate flexible hinge elements of equal length joining said first and second receptacle means'.

8. An assembly as in claim 1, wherein said assembly is further adapted for combining more than two of said handheld articles and includes more than two receptacle means' and more than one of said hinge means.

9. An assembly, of components, adapted for combining a first handheld article with a second handheld article, said first handheld article and said second handheld article chosen from at least one of the following categories; electronic devices, electrical devices, mechanical devices and items for personal use including medication, cosmetics and food products, said assembly comprising:
    receptacle means for receiving and reversibly engaging at least a portion of said first handheld article, said receptacle means defining first and second planes;
    said second handheld article, said second handheld article defining third and fourth planes; and
    hinge means for hingedly joining said receptacle means and said second handheld article, said hinge means adapted for rotation of said receptacle means and said second handheld article between a first position and a second position, wherein rotation between said first position and said second position includes 360 degrees;
    said assembly components adapted for multiple configurations, wherein a first configuration comprises:
    one face of each of said receptacle means and said second handheld article are oppositely exposed in the first position and the faces are now adjacently concealed in the second position upon rotation; and
    wherein a second configuration comprises:
    only one of said faces is exposed in the first position and the other of said faces is exposed in the second position resulting in said exposed face of said first position now being concealed upon rotation.

10. An assembly as in claim 9, wherein said assembly further comprises latching means for selectively latching said assembly in at least one of said first and second positions.

11. An assembly as in claim 9, wherein said at least one of said receptacle means' and said hinge means is adapted to facilitate transfer of power and/or data between said handheld articles.

12. An assembly as in claim 9, wherein at least one of said receptacle means' and said hinge means is adapted to facilitate transfer of power and/or data between at least one of said handheld articles and devices or systems external of said assembly.

13. An assembly as in claim 9, wherein at least two of said receptacle means, said second handheld article and said hinge means comprise a unitary structure.

14. A system, having components, for combining two handheld articles, a first handheld article and at least one member of at least one set of additional handheld articles, said system comprising:
    providing said at least one member of at least one set of additional handheld articles, wherein members of said set have functional characteristics consistent with at least one of the following categories; electronic devices, electrical devices, mechanical devices and items for personal use including medication, cosmetics and food products, wherein further each member of said set has external dimensions and other external characteristics conducive for engagement with a second receptacle means;

providing a first receptacle means, said first receptacle means adapted for receiving and reversibly engaging at least a portion of said first handheld article and includes four sidewalls, a first two having lengths longer than a second two;

providing said second receptacle means, said second receptacle means adapted for receiving and reversibly engaging at least a portion of said at least one member and includes four sidewalls, a first two having lengths longer than a second two;

providing a hinge means for hingedly joining said first and second receptacle means' along one of said first sidewalls of each of said first and second receptacle means', said hinge means adapted for rotation of said first and second receptacle means' between a first position and a second position, wherein rotation between said first position and said second position includes 360 degrees;

said system components adapted for multiple configurations, wherein a first configuration comprises:

one face each of said first receptacle means and said second receptacle means oppositely exposed in the first position and the faces are now adjacently concealed in the second position upon rotation; and wherein a second configuration comprises:

only one of said faces is exposed in the first position and the other of said faces is exposed in the second position resulting in said exposed face of said first position now being concealed upon rotation.

15. A system as in claim 14, wherein in lieu of said second receptacle means, said at least one member is adapted to be hingedly joined to said first receptacle means, having four sidewalls, a first two having lengths longer than a second two and said hinge means is adapted for hingedly joining said first receptacle means to said at least one member along one of said first sidewalls of each of said first receptacle means and said at least one member; and said system components are further adapted for additional configurations, wherein a third configuration comprises:

one face of each of said first receptacle means and said at least one member are oppositely exposed in the first position and the faces are now adjacently concealed in the second position upon rotation; and wherein a fourth configuration comprises:

only one of said faces is exposed in the first position and the other of said faces is exposed in the second position resulting in said exposed face of the said first position now being concealed upon rotation.

16. A system as in claim 14, wherein said system further comprises receiving and reversible engagement means adapted to facilitate receiving and reversible engagement of said at least one member with said second receptacle means in lieu of said second receptacle means being adapted to receive and reversibly engage said at least one member.

17. A method for combining two handheld articles, a first handheld article and at least one additional handheld article through the use of an assembly of components, said assembly comprising:

said first handheld article and said at least one additional handheld article;

a first receptacle means for receiving and reversibly engaging at least a portion of said first handheld article;

a second receptacle means for receiving and reversibly engaging at least a portion of said at least one additional handheld article, wherein said two articles are each chosen from at least one of the following categories; electronic devices, electrical devices, mechanical devices and items for personal use including medication, cosmetics and food products, wherein further said first and second receptacle means' are adapted to be hingedly joined along a first sidewall of each of said receptacle means', said first sidewalls being longer than second sidewalls of said first and second receptacle means';

a hinge means for hingedly joining said first and second receptacle means' along one of said first sidewalls of each of said first and second receptacle means', said hinge means adapted for rotation of said first and second receptacle means' between a first position and a second position, wherein rotation between said first position and said second position includes 360 degrees;

said assembly components adapted for multiple configurations, wherein a first configuration comprises:

two oppositely exposed handheld article surfaces in the first position and the surfaces are now adjacently concealed in the second position upon rotation;

wherein a second configuration comprises:

only one of said surfaces is exposed in the first position and the other of said surfaces is exposed in the second position resulting in said exposed surface of said first position now being concealed upon rotation; and said method comprising the following steps:

a) engage at least a portion of said first handheld article with said first receptacle means;

b) choose said at least one additional handheld article from said categories;

c) engage at least a portion of said at least one additional handheld article of step (b) with said second receptacle means;

d) hingedly join said first and second receptacle means' along one of the longer of said sidewalls of each of said receptacle means' and in such a manner that said at least one hinge means allows relative rotation of said first and second receptacle means' of 360 degrees.

18. A method as in claim 17, wherein said method further comprises the additional step:

transmit power and/or data between said two handheld articles.

19. A method as in claim 17, wherein said method further comprises the additional step:

transmit power and/or data between at least one of said two handheld articles and devices or systems external of said assembly.

20. A method as in claim 17, wherein said at least one additional handheld article alternately is adapted to be hingedly joined to said first receptacle and said method further comprises the following step replacing steps (c) and (d):

c') hingedly join said at least one additional handheld article to said first receptacle.

21. A method as in claim 20, wherein said method further comprises the additional step:

d') transmit power and/or data between said two handheld articles.

22. A method as in claim 20, wherein said method further comprises the additional step:
   d') transmit power and/or data between at least one of said two handheld articles and devices or systems external of said assembly.

23. A method as in claim 17, wherein said assembly further comprises:
   receiving and reversible engagement means adapted to facilitate receiving and reversible engagement of said at least one additional handheld article with said second receptacle means in lieu of said second receptacle means being adapted to receive and reversibly engage said at least one additional handheld article, said method further comprises the additional steps replacing step (c):
   c') engage said at least one additional handheld article with said receiving and reversible engagement means; and
   c") engage said receiving and reversible engagement means with said second receptacle means.

* * * * *